United States Patent

Jaeschke

[11] Patent Number: 5,294,839
[45] Date of Patent: Mar. 15, 1994

[54] SOFT START AC TOOL HANDLE TRIGGER SWITCH CIRCUIT

[75] Inventor: James R. Jaeschke, Waukesha, Wis.

[73] Assignee: Eaton Corporation, Cleveland, Ohio

[21] Appl. No.: 905,855

[22] Filed: Jun. 29, 1992

[51] Int. Cl.$^5$ ............................................. H01H 47/22
[52] U.S. Cl. .................................. 307/127; 307/125; 323/324; 363/49
[58] Field of Search ...................... 363/49, 21, 37, 143, 363/50; 323/908, 352-354, 367; 361/58, 3, 9, 13, 28; 307/127, 116, 125, 128, 139; 318/515, 516

[56] References Cited

U.S. PATENT DOCUMENTS

| | | | |
|---|---|---|---|
| 4,008,416 | 2/1977 | Nakasone | 315/194 |
| 4,271,460 | 6/1981 | Baker | 363/49 |
| 4,405,975 | 9/1983 | Overstreet et al. | 363/49 |
| 4,555,741 | 11/1985 | Masaki | 361/58 |
| 4,668,908 | 5/1987 | Aoki et al. | 323/324 |
| 4,686,616 | 8/1987 | Williamson | 363/21 |
| 4,716,511 | 12/1987 | Masaki | 363/49 |
| 4,719,553 | 1/1988 | Hinckley | 363/49 |
| 4,855,649 | 8/1989 | Masaki | 363/49 |
| 4,928,218 | 5/1990 | Kluttz | 363/37 |
| 4,992,718 | 2/1991 | Kumaki | 318/768 |

Primary Examiner—A. D. Pellinen
Assistant Examiner—Aditya Krishnan
Attorney, Agent, or Firm—Andrus, Sceales, Starke & Sawall

[57] ABSTRACT

A soft start tool handle trigger switch circuit (10) applies voltage from an AC source (12) to a portable tool electric motor (10). A current limiter (30) is connected in series between the AC source (12) and motor (14). A first sub-circuit (32) is connected in parallel with the motor (14) and includes actuator circuitry (34) tripping an actuator solenoid (36). A second sub-circuit (40) is connected in parallel with the current limiter (30) and has a pair of contacts (44, 46) actuated from an open condition to a closed condition upon movement of an actuator plunger (38). An NTC thermistor (48) is connected in series with the actuator circuitry and is physically proximate and heated by heat from the current limiter (30) to reduce the resistance of the NTC thermistor (48) and supply increased current to the actuator circuit (34) for earlier closing of the bypass sub-circuit (40), to stop the current-induced heating of the current limiter (30). Positive kick-off opening of the bypass contacts (44, 46) is provided upon release of the user finger engaged trigger (28) as the latter moves from its depressed to its extended position. Voltage sensitive (34) and time sensitive (70) circuitry is provided.

11 Claims, 3 Drawing Sheets

SOFT START AC TOOL HANDLE TRIGGER SWITCH CIRCUIT

BACKGROUND AND SUMMARY

The invention relates to tool handle trigger switch circuits for applying voltage from an AC source to a portable tool electric motor.

Soft turn-on circuitry using a current limiting resistor for limiting the amount of power initially applied to a load from a power source is known in the prior art. This is typically accomplished by a current limiting resistor. This type of soft turn-on circuitry has not been applied to tool handle trigger switches because of the heat generated by the current limiting resistor and the inability to dissipate same within the small confines of a compact tool handle trigger switch. Instead, soft start tool handle trigger switch circuitry uses an SCR and gradually phases-on the SCR to provide soft turn-on. Initially, the SCR is on for only a small portion of the AC cycle, which portion is increased with subsequent cycles to gradually apply power to the portable tool electric motor. This phasing-on soft start circuitry is objectionable because of its high cost, including the SCR, and concerns about reliability.

The present invention provides a soft start tool handle trigger switch circuit for applying voltage from an AC source to a portable tool electric motor without the expense of the above noted phasing-on circuitry. The present invention uses a current limiter connected in series between the AC source and the motor, and solves the above noted heating problem.

DETAILED DESCRIPTION

Figure 1:
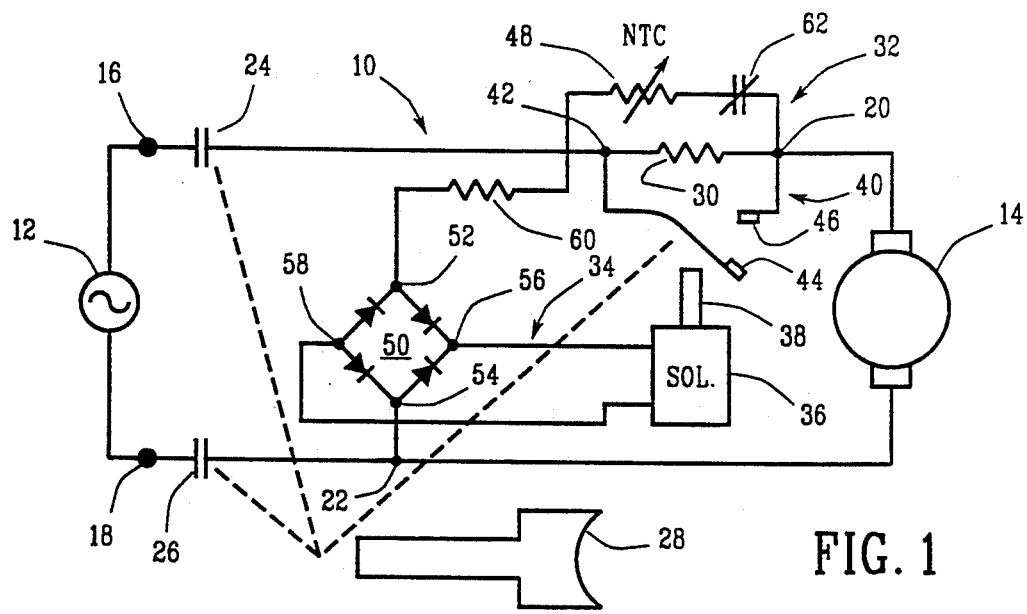
FIG. 1 is a schematic circuit diagram of a soft start tool handle trigger switch circuit in accordance with the invention.

FIG. 1 shows a soft start tool handle trigger switch circuit 10 for applying voltage from an AC source 12 to a portable tool electric motor 14. The circuit includes line terminals 16 and 18 connected to AC source 12, and load terminals 20 and 22 connected to motor 14. The circuit includes contacts 24 and 26 which close upon depression of trigger 28, thus applying voltage from AC source 12 to motor 14.

The circuit includes a current limiter provided by current limiting resistor 30 connected in series between AC source 12 and motor 14. A first sub-circuit 32 is connected in parallel with motor 14 between terminals 20 and 22, and includes actuator circuitry 34 responsive to a given parameter to trip an actuator provided by solenoid 36 to extend plunger 38 upwardly from a first lower retracted position to a second upper extended position. A second sub-circuit 40 is connected in parallel with current limiting resistor 30 between terminal 20 and node 42, and includes a pair of contacts 44 and 46 actuated from an open condition to a closed condition upon upward movement of solenoid plunger 38. Closure of contacts 44 and 46 completes sub-circuit 40 to provide a bypass circuit around current limiting resistor 30 and apply full power to motor 14 from AC source 12. Prior to closure of contacts 44 and 46, the power applied to motor 14 from AC source 12 is limited by current limiting resistor 30, to provide soft start turn-on.

In the preferred embodiment, FIG. 1, an NTC, negative temperature coefficient, thermistor 48 is connected in series with the actuator circuitry and is physically proximate and heated by heat from current limiting resistor 30 to reduce the resistance of NTC thermistor 48, to in turn supply increased current through NTC thermistor 48 to actuator circuitry 34 for earlier tripping of solenoid 36. Current limiting resistor 30 heats up due to the flow of motor current therethrough, which heat is transmitted to NTC thermistor 48 to reduce the resistance thereof, to in turn provide earlier triggering of solenoid 36 to in turn provide an earlier closing of contacts 44 and 46 to complete the bypass circuit 40 around current limiting resistor 30. Current flow from node 42 then follows the lower resistance path through sub-circuit 40, rather than through resistor 30, to stop the heating of resistor 30, thus solving the above noted heat related problems.

Further in the preferred embodiment, sub-circuit 32 includes a diode rectifier bridge 50 having AC input terminals 52 and 54 connected across motor 14, and having DC output terminals 56 and 58 connected to solenoid 36. The actuator circuitry is voltage sensitive and responds to a threshold voltage across the motor as selected by resistor 60, to trip solenoid 36. The voltage across the motor builds up as motor RPM increases. When the voltage is high enough, the solenoid trips and closes contacts 44, 46. It is also preferred that sub-circuit 32 include contacts 62 which open upon closure of contacts 44, 46, to be described. In an alternate embodiment, an AC coil is used instead of rectifier bridge 50 and solenoid 36.

Figure 2:
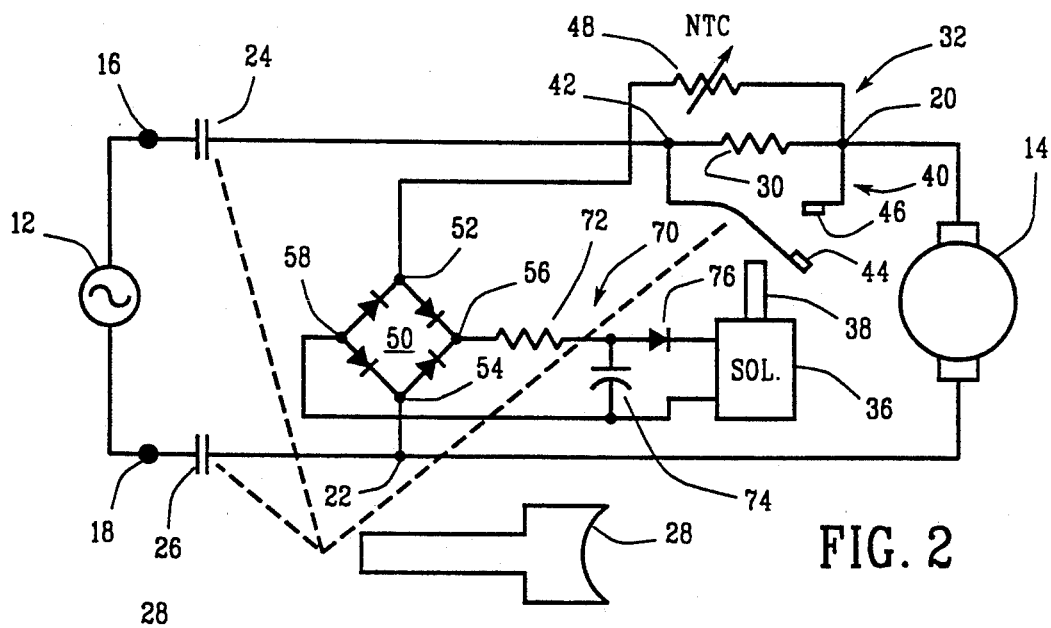
FIG. 2 is a schematic circuit diagram showing an alternate embodiment.

FIG. 2 shows an alternate embodiment and uses like reference numerals from FIG. 1 where appropriate to facilitate understanding. Actuator circuitry 70 is time sensitive and trips solenoid 36 after a given delay set by the RC timing constant of resistor 72 and capacitor 74 and the trigger voltage of SUS, silicon unilateral switch, 76. Upon depression of trigger 28, contacts 24 and 26 close, and capacitor 74 begins charging with current supplied through current limiting resistor 30, terminal 20, NTC thermistor 48, rectifier bridge 50 and resistor 72. When the voltage across capacitor 74 reaches the trigger voltage of SUS 76, the SUS breaks over and dumps the capacitor charge into solenoid 36 to energize the latter to drive plunger 38 upwardly to actuate contacts 44 and 46 to their closed condition, completing bypass sub-circuit 40 around current limiting resistor 30 and applying full power to motor 14.

Figure 3:
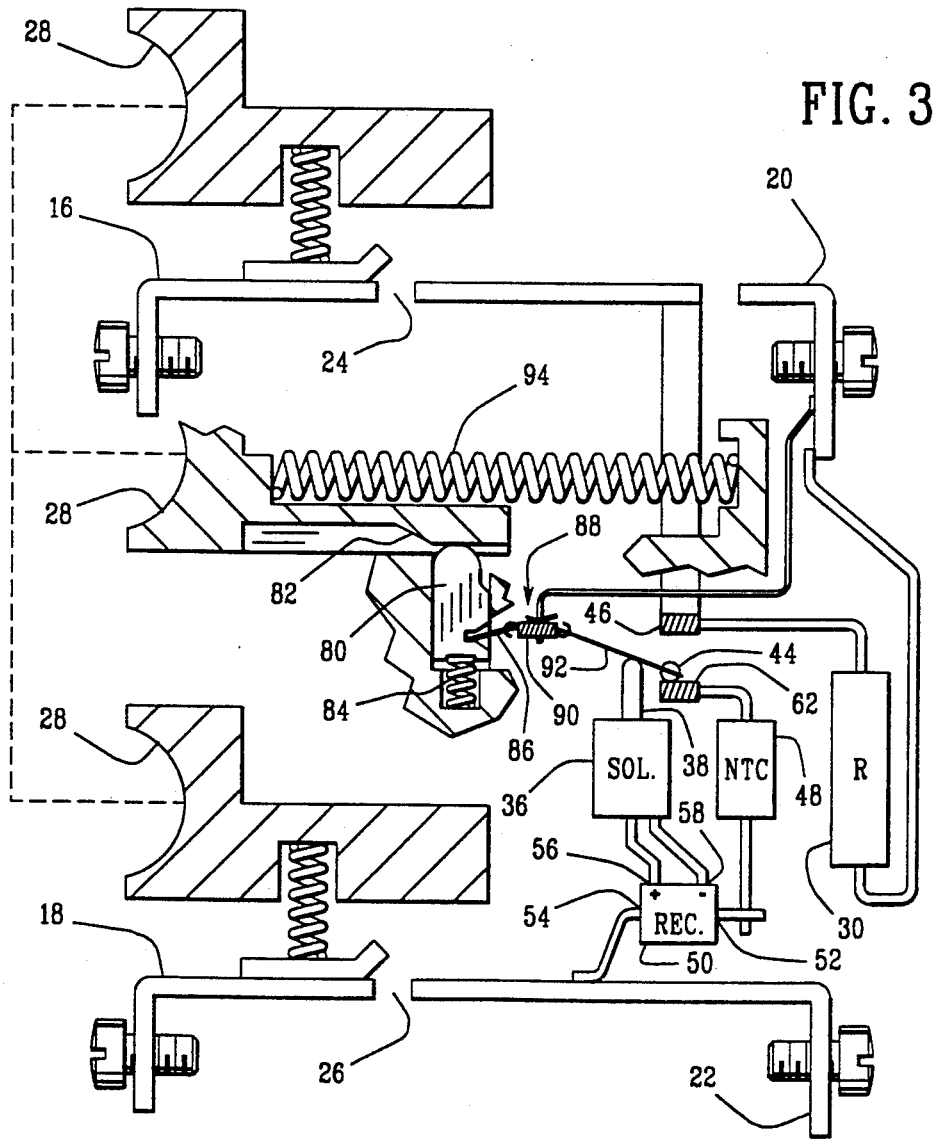
FIG. 3 is a schematic electromechanical diagram further showing the tool handle trigger switch circuit of FIG. 1.

FIG. 3 schematically shows a user finger engaged trigger switch with portions schematically separated for illustration. Trigger 28 has a leftward extended position, FIG. 3, and is movable rightwardly to a depressed position, FIGS. 4 and 5, to close contacts 24 and 26 to connect AC source 12 to current limiting resistor 30 and motor 14. Upon rightward depression of trigger 28, plunger 80 moves upwardly along sloped camming surface 82 due to the bias of spring 84. This moves the left arm 86 of over-center contact mechanism 88, including over-center spring 90, to a position just short of over-center, FIG. 4. Actuation of solenoid 36 causes plunger 38 to move upwardly to engage and push upwardly against right arm 92 carrying movable contact 44, and to move right arm 92 upwardly past the over-center toggle point, to actuate and toggle over-center contact mechanism 88, such that right contact arm 92 snaps upwardly, FIG. 5, such that movable contact 44 disengages stationary contact 62 and engages stationary contact 46.

Figure 4:
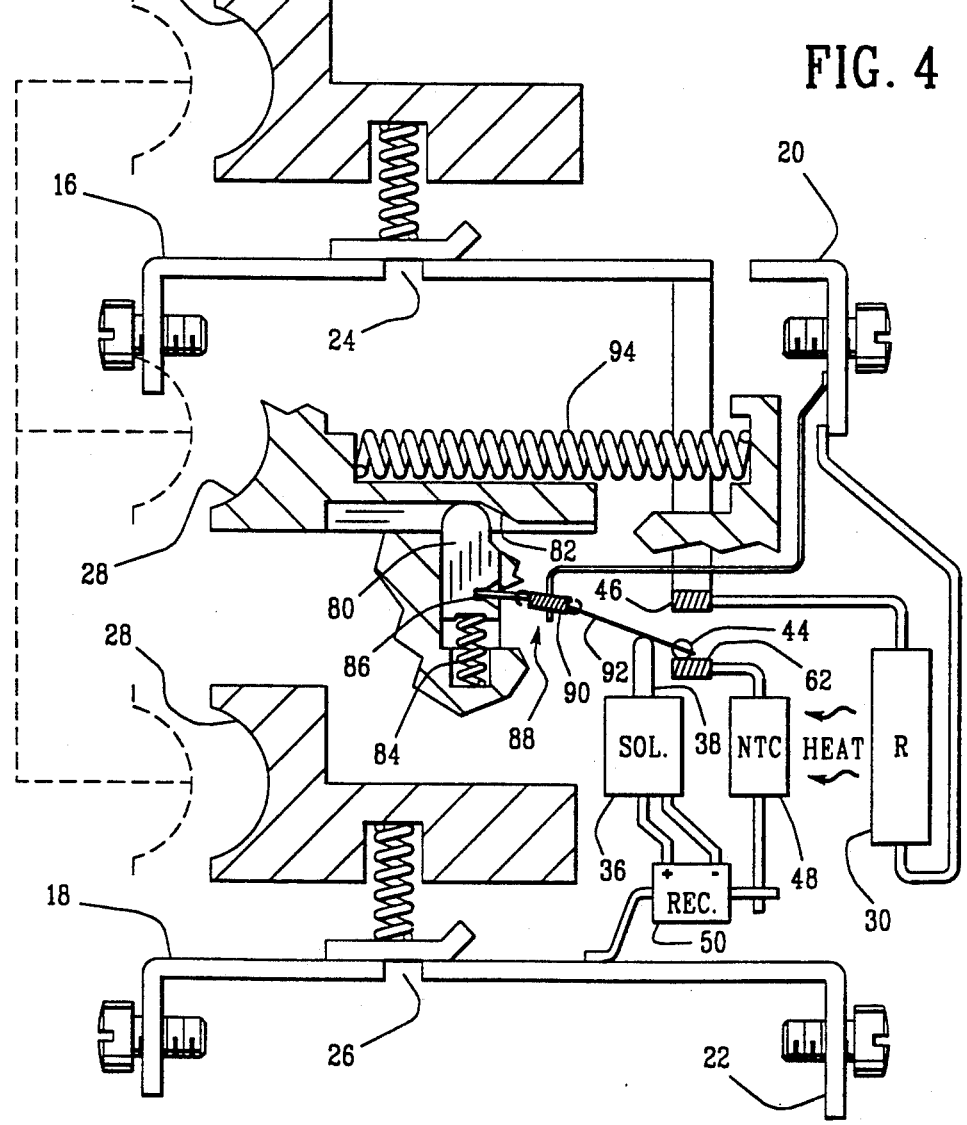
FIG. 4 is like FIG. 3 and illustrates the circuit during operation.
Figure 5:
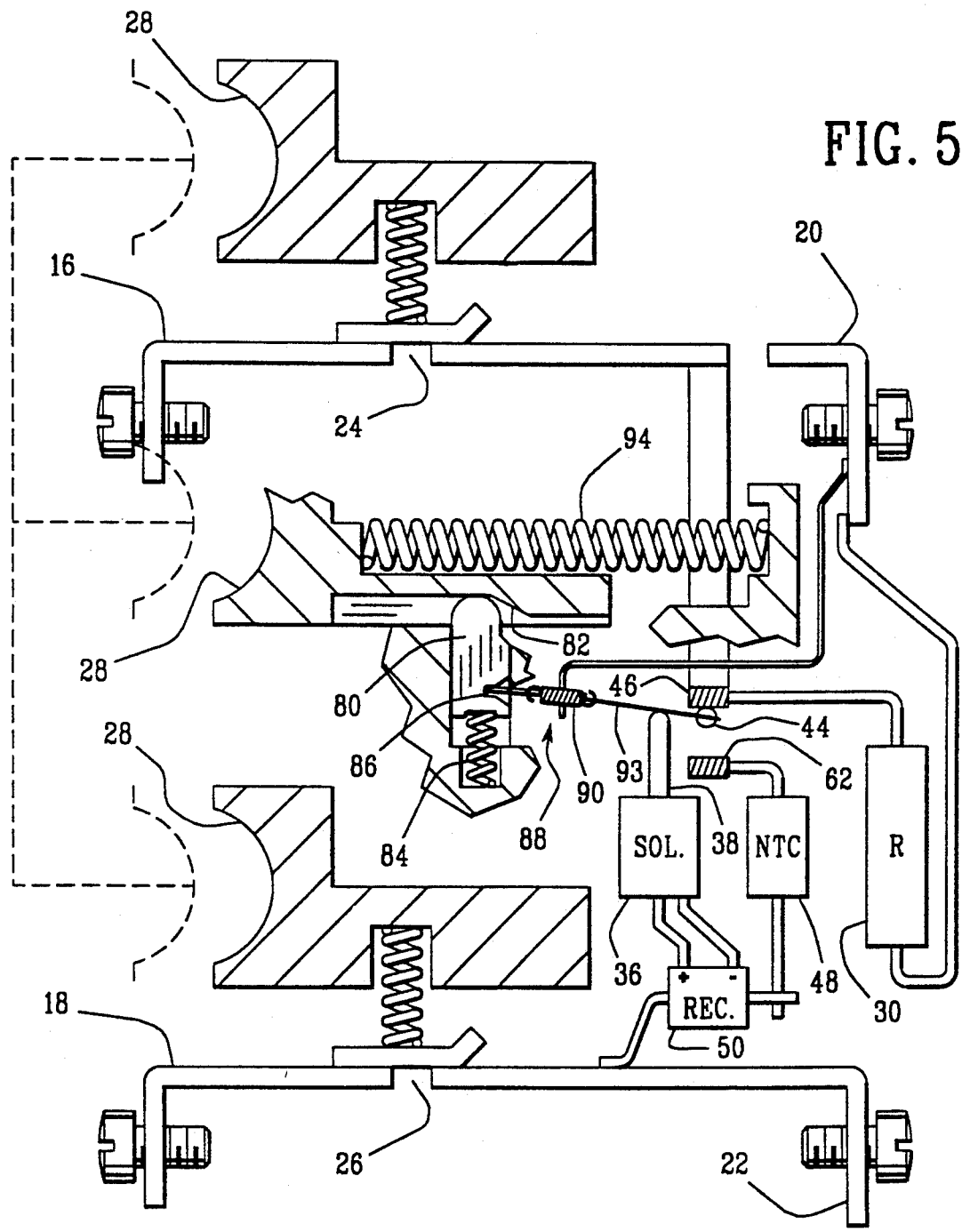
FIG. 5 is like FIG. 4 and further illustrates operation.

Movable contact 44 thus has a first position, FIGS. 1, 3 and 4, engaging stationary contact 62 and disengaging stationary contact 46, such that current flows through sub-circuit 32, FIG. 1, including NTC thermistor 48 and rectifier bridge 50, and such that current flow through sub-circuit 40, FIG. 1, is interrupted. Movable contact 44 has a second position, FIG. 5, engaging stationary contact 46 and disengaging stationary contact 62, such that current flows through sub-circuit 40, FIG. 1, and such that current flow through sub-circuit 32 is interrupted.

When trigger 28 is released, it moves leftwardly due to biasing spring 94, which in turn cams plunger 80 downwardly along camming surface 82, which in turn moves left arm 86 downwardly to toggle over-center contact mechanism 88, such that right arm 92 snaps downwardly, such that movable contact 44 disengages stationary contact 46 and engages contact 62. Contacts 44 and 46 are thus positively actuated from their closed condition to their open condition upon leftward movement of trigger 28 from its depressed position to its extended position. This provides positive kick-off opening of contacts 44 and 46 upon release of trigger 28. In the on position of the switch with trigger 28 depressed rightwardly, contacts 44 and 46 are bistable and remain in whichever condition last actuated to, i.e. if contacts 44 and 46 are actuated to a closed condition, they will remain closed, without further energization, until actuated to their open condition, and then will remain in the open condition, without further energization, until actuated to the closed condition, and so on. In the off position of the switch with trigger 28 in its leftwardly extended position, contacts 44 and 46 are biased to their open condition. As trigger 28 moves leftwardly, contacts 24 and 26 open prior to the opening of contacts 44 and 46. Contacts 24 and 26 make and break the circuit for applying power to the motor. Contacts 44 and 46 are not used for such function, which in turn maximizes the life of contacts 44 and 46, for reliable operation.

It is recognized that various equivalents, alternatives and modifications are possible within the scope of the appended claims.

I claim:

1. A soft start tool handle trigger switch circuit for applying voltage from an AC source to a portable tool electric motor, and having a user operated trigger movable between an on position connecting said motor to said AC source, and an off position disconnecting said motor from said Ac source, comprising:
    a current limiter connected in series between said AC source and said motor;
    a first sub-circuit in parallel with said motor and comprising actuator circuitry responsive to a given parameter to trip an actuator to move from a first position to a second position;
    a second sub-circuit in parallel with said current limiter and in series with said motor and comprising a pair of contacts actuated from an open condition to a closed condition upon movement of said actuator from said first position to said second position,
    said second sub-circuit and said current limiter being connected at a common node, said node being connected in series with said motor, and such that when said trigger is moved from said off position to said on position, AC current from said AC source is continuously supplied to said motor through said node, first through said current limiter and then through said second sub-circuit.

2. The invention according to claim 1 wherein said current limiter comprises a current limiting resistor, and comprising an NTC thermistor in series with said actuator circuitry and heated by heat from said current limiting resistor to reduce the resistance of said NTC thermistor and supply increased current to said actuator circuitry.

3. The invention according to claim 1 wherein said first sub-circuit comprises in combination a diode rectifier bridge having AC input terminals connected across said motor, and having DC output terminals, and said actuator comprises a solenoid connected to said DC output terminals and having a plunger actuating said contacts.

4. The invention according to claim 1 wherein said first sub-circuit comprises in combination an AC coil actuating said contacts.

5. The invention according to claim 1 comprising voltage sensitive actuator circuitry responsive to a threshold voltage across said motor to trip said actuator.

6. The invention according to claim 1 comprising time sensitive actuator circuitry tripping said actuator after a given delay.

7. The invention according to claim 1 wherein said contacts of said second sub-circuit comprise a movable contact and a stationary contact, and wherein said first sub-circuit comprises a stationary contact, wherein said movable contact has a first position engaging said stationary contact of said first sub-circuit and disengaging said stationary contact of said second sub-circuit such that current flows through said first sub-circuit in parallel with said motor and such that current flow through said second sub-circuit is interrupted, and wherein said movable contact has a second position engaging said stationary contact has a second sub-circuit and disengaging said stationary contact of said first sub-circuit, such that current flow through said first sub-circuit is interrupted and such that current flows through said second sub-circuit.

8. The invention according to claim 1 comprising a mechanical linkage between said rigger and said contacts of said second sub-circuit and actuating said contacts from said closed condition to said open condition upon movement of said trigger from said on position to said off position.

9. The invention according to claim 8 wherein said contacts are bistable when said trigger is in said on position and remain in whichever condition last actuate to.

10. A soft start tool handle trigger switch circuit for applying voltage from an AC source to a portable tool electric motor, and having a user operated trigger movable between an on position connecting said motor to said AC source, and an off position disconnecting said motor from said Ac source, comprising:
    a current limiting resistor connected in series between said AC source and said motor;

a first sub-circuit in parallel with said motor and comprising actuator circuitry comprising an actuator having a plunger movable between first and second positions, and an NTC thermistor in series with said actuator circuitry and heated by heat from said current limiting resistor to reduce the resistance of said NTC thermistor and supply increased current to said actuator;

a second sub-circuit in parallel with said current limiting resistor and in series with said motor and comprising a pair of contacts actuated by said actuator plunger from an open condition to a closed condition upon movement of said plunger from said first position to said second position, said second sub-circuit and said current limiter being connected at a common node, said node being connected in series with said motor, and such that when said trigger is moved from said off position to said on position, AC current from said AC source is continuously supplied to said motor through said node, first through said current limiter and then through said second sub-circuit.

11. The invention according to claim 10 comprising a mechanical linkage between said trigger and said contacts of said second sub-circuit and actuating said contacts from said closed condition to said open condition upon movement of said trigger from said on position to said off position, wherein said contacts of said second sub-circuit comprise a movable contact and a stationary contact, and wherein said first sub-circuit comprises a stationary contact, wherein said movable contact has a first position engaging said stationary contact of said first sub-circuit and disengaging said stationary contact of said second sub-circuit such that current flows through said first sub-circuit in parallel with said motor and such that current flow through said second sub-circuit is interrupted, and wherein said movable contact has a second position engaging said stationary contact of said second sub-circuit and disengaging said stationary contact of said first sub-circuit, such that current flow through said first sub-circuit is interrupted and such that current flows through said second sub-circuit.

* * * * *